(12) United States Patent
Forrester et al.

(10) Patent No.: US 12,067,616 B2
(45) Date of Patent: *Aug. 20, 2024

(54) METHODS AND SYSTEMS FOR PROVIDING PERSONALIZED, REAL-TIME INFORMATION BASED ON REMOTELY RETRIEVED INFORMATION

(71) Applicant: Capital One Services, LLC, McLean, VA (US)

(72) Inventors: Katherine Forrester, Dallas, TX (US); Nicholas Dolle, McKinney, TX (US); Xiaoxiang Zhang, McKinney, TX (US); Kurt Johnson, Dallas, TX (US); Jeffrey Whalen, Frisco, TX (US); David Gray, Ashland, TX (US); Shaun Webb, San Francisco, CA (US); Maninder Suri, Plano, TX (US); Ruhaab Markas, Allen, TX (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/059,238

(22) Filed: Nov. 28, 2022

(65) Prior Publication Data

US 2023/0097380 A1   Mar. 30, 2023

Related U.S. Application Data

(63) Continuation of application No. 17/550,500, filed on Dec. 14, 2021, now Pat. No. 11,514,520, which is a (Continued)

(51) Int. Cl.
  *G06Q 40/03*   (2023.01)

(52) U.S. Cl.
  CPC .................................. *G06Q 40/03* (2023.01)

(58) Field of Classification Search
  CPC ................................................. G06Q 40/03
  (Continued)

(56) References Cited

U.S. PATENT DOCUMENTS

| 5,797,134 A | * | 8/1998 | McMillan | G06Q 40/08 705/400 |
| 8,140,358 B1 | * | 3/2012 | Ling | G07C 5/008 340/439 |

(Continued)

*Primary Examiner* — Robert R Niquette
(74) *Attorney, Agent, or Firm* — Foley & Lardner LLP

(57) ABSTRACT

This disclosure relates generally to systems and methods for providing personalized financing information and, more particularly, systems and methods for providing personalized financing information via a dealership website using an API associated with a financial service provider. In one embodiment, a system includes memory hardware storing instructions that configure processing hardware to receive a loan request for a buyer via a real-time API that includes at least buyer identification and financial information and information associated at least one inventory item presented on a dealership website. The system may also determine financing information comprising prospective financing terms for the at least one item based on at least the loan request. The server may also provide, to the dealership server via the real-time API, the determined financing information for presentation on the dealership website, including prospective financing terms information corresponding to each of the at least one item.

20 Claims, 12 Drawing Sheets

Related U.S. Application Data continuation of application No. 16/775,814, filed on Jan. 29, 2020, now abandoned, which is a continuation of application No. 15/861,829, filed on Jan. 4, 2018, now Pat. No. 10,580,071, which is a continuation of application No. 14/599,127, filed on Jan. 16, 2015, now Pat. No. 10,592,981.

(60) Provisional application No. 61/928,804, filed on Jan. 17, 2014.

(58) Field of Classification Search
USPC .................................................. 705/35–45
See application file for complete search history.

(56) References Cited

U.S. PATENT DOCUMENTS

| | | | | |
|---|---|---|---|---|
| 8,311,858 | B2 * | 11/2012 | Everett | G07C 5/008 340/576 |
| 8,799,036 | B1 * | 8/2014 | Christensen | G06Q 30/0208 340/439 |
| RE47,225 | E * | 2/2019 | Flick | G08B 21/02 |
| 10,354,333 | B1 * | 7/2019 | Hayward | B60Q 5/006 |
| 2001/0011246 | A1 * | 8/2001 | Tammaro | G06Q 20/10 705/38 |
| 2002/0116328 | A1 * | 8/2002 | Bird | G06Q 40/03 705/38 |
| 2002/0138411 | A1 * | 9/2002 | Monlux | G06Q 40/03 705/38 |
| 2009/0024419 | A1 * | 1/2009 | McClellan | G06Q 40/08 705/4 |
| 2010/0131304 | A1 * | 5/2010 | Collopy | G06Q 30/0224 705/4 |
| 2011/0106370 | A1 * | 5/2011 | Duddle | G09B 9/042 701/31.4 |
| 2011/0137684 | A1 * | 6/2011 | Peak | G06Q 30/02 707/E17.046 |
| 2012/0072244 | A1 * | 3/2012 | Collins | G06Q 10/10 705/4 |
| 2012/0101855 | A1 * | 4/2012 | Collins | G06Q 40/08 705/4 |
| 2012/0109692 | A1 * | 5/2012 | Collins | G06Q 40/08 705/4 |
| 2014/0257874 | A1 * | 9/2014 | Hayward | G07C 5/008 705/4 |
| 2015/0006207 | A1 * | 1/2015 | Jarvis | G06Q 10/06398 705/4 |
| 2015/0127524 | A1 * | 5/2015 | Jacobs | G06Q 40/03 705/38 |
| 2017/0076396 | A1 * | 3/2017 | Sudak | G07C 5/085 |
| 2018/0047107 | A1 * | 2/2018 | Perl | G06N 5/02 |
| 2021/0110480 | A1 * | 4/2021 | Kwak | G07C 5/008 |
| 2021/0256616 | A1 * | 8/2021 | Hayward | G06V 30/274 |
| 2023/0048622 | A1 * | 2/2023 | Hayward | G08G 1/096827 |
| 2023/0097380 | A1 * | 3/2023 | Forrester | G06Q 40/03 705/38 |

\* cited by examiner

FIG. 8

Congratulations
You've been approved up to $30,000!  —822

However before you come to the xxx, we will need:
Proof of residence (xxx of proof or residence)
Proof of income
Picture of your driver's license
Any questions please call xxx and we'll help you out.

Let's get specific!  —824

Cash Down $0 — $10,000

820

Do you have a trade in? Yes | No  —826

Make of Vehicle ▶

Model of Vehicle ▶    Year ▶    OR    VIN Number

How much debt do you owe on this vehicle? $0

Current mileage:

[Calculate Trade Value]

| home | select a vehicle | protect your vehicle | why driver's select | location & hours | ds culture | blog |

You're Approved    $5,000    72 Months    $2,000    My Garage (3)

— 1010

Photos driversselect

1/56 xxx $19,999   xxx $341   xxx 3.93% — 1012 xxx xxx xxx
xxx xxx xxx
xxx
xxx xxx xxx   72 Months ▶
$2,000   $5,000

Protect Your Investment — 1016
xxx xxx xxx   Edit your xxx — 1014
☑ + $6/mo   xxx
  xxx xxx xxx
Call & Reserve   ☐ + $6/mo
(868) 868-8046   xxx xxx xxx
— 1018

Vehicle Commons.
CLEAN CARFAX. ONE OWNER-OFF LEASE. SUNROOF. FULL
POWER FEATURES. KEYLESS ENTRY. SIRIUS. 17" ALLOYS.
NOTICE THAT THIS IS NOT A BASE XXX XXX.

Vehicles You Might Like

VEHICLE DETAILS

FIG. 11

METHODS AND SYSTEMS FOR PROVIDING PERSONALIZED, REAL-TIME INFORMATION BASED ON REMOTELY RETRIEVED INFORMATION

CROSS-REFERENCE TO RELATED APPLICATIONS

This application is a continuation of U.S. patent application Ser. No. 17/550,500, filed Dec. 14, 2021, which is a continuation of U.S. patent application Ser. No. 16/775,814, filed Jan. 29, 2020, which is a continuation of U.S. patent application Ser. No. 15/861,829, filed Jan. 4, 2018, which is a continuation of U.S. patent application Ser. No. 14/599,127, filed Jan. 16, 2015, which claims the benefit of priority of U.S. Provisional Application No. 61/928,804, filed Jan. 17, 2014. The content of the foregoing applications is incorporated herein in its entirety by reference.

FIELD

The disclosed embodiments generally relate to financing sales of items and, in particular, providing a real-time application programming interface ("API") that may be used to provide enhanced financing information to prospective buyers of automotive vehicles based on their personal financial profile.

BACKGROUND

The digital revolution has fundamentally changed how automotive vehicles are bought and sold. Prospective buyers were formerly at the mercy of brick and mortar automotive dealers and lenders when attempting to shop for a new vehicle. The basic question of "how much can I afford?" was often answered with inaccurate information or information that served the needs of the other parties—not the buyer.

Upon entering the information age, the balance of power in the automotive market has shifted. With ample information now available online about, vehicles for sale, such as tax values, the sale price of previous or similar sales, detailed photographs and other detailed information, and the ability to comparison shop, prospective buyers are increasingly able to make more informed decisions when placing purchase offers. Numerous lender-sponsored online loan applications have emerged that allow buyers to reach some level of clarity with respect to how much they can reasonably afford. These online loan applications, however, often require leaving a website listing vehicles for sale to visit a third party lender's website to apply for a loan associated with each desired vehicle. By requiring a buyer to visit a third party lender's website to acquire loan information, the buyer is unable to view loan information integrated with a vehicle listing or multiple vehicle listings. To conduct this loan application process for each desired vehicle, a buyer may spend a significant portion of time, potentially missing an opportunity to purchase a desired vehicle, or approach a purchase uninformed on alternative loan terms that may apply to the desired vehicle.

Accordingly, a need exists to provide prospective buyers of items, such as automotive vehicles, enhanced information relating to financing while shopping for the desired item.

SUMMARY

Consistent with a disclosed embodiment, a financial service system provides personalized financing information for incorporation into a dealership website via an API. The system may comprise memory hardware storing instructions and processing hardware configured to execute the instructions to perform operations consistent with disclosed embodiments. In some embodiments, the system may receive, from a dealership server via a real-time API configured to provide financing information determinations, a loan request for a buyer that includes at least buyer identification information, buyer financial information, and information associated with at least one item contained within an inventory listing presented on a dealership website associated with the dealership server. The system may further determine financing information comprising prospective financing terms for the at least one item based on at least the loan request. The system may also provide, to the dealership server via the real-time API, the determined financing information for presentation on the dealership website, wherein the determined financing information comprises prospective financing terms information corresponding to each of the at least one item.

Consistent with another disclosed embodiment, a computer-implemented method provides personalized financing information for incorporation into a dealership website via an API. The method may include receiving, from a dealership server via a real-time API configured to provide financing information determinations, a loan request for a buyer that includes at least buyer identification information, buyer financial information, and information associated with a plurality of items contained within an inventory listing presented on a dealership website associated with the dealership server. The method may also include determining, by one or more processors, financing information comprising prospective financing terms for each of the plurality of items based on at least the loan request, wherein each of the plurality of terms applies to a different item. The method may also include providing, to the dealership server via the real-time API, the determined financing information for presentation on the dealership website in association with the plurality of items, wherein the determined financing information comprises prospective financing terms information corresponding to each of the plurality of items.

Consistent with another disclosed embodiment, a buyer system for presenting personalized financing information associated with at least one item contained within an inventory listing is disclosed. The buyer system may include interface hardware configured to display information received from a dealership server, including the at least one item, memory hardware storing instructions, and processing hardware configured to execute the instructions to receive, from a dealership server, information associated with a dealership website, including the at least one item. The processing hardware may further execute the instructions to display, via the interface hardware, the information associated the dealership website, receive, via the interface hardware, buyer identification information and buyer financial information, and provide, to the dealership server, the buyer identification information and buyer financial information for providing, with information associated with the at least one item, to a financial service system for determination of financing information. The processing hardware may further execute the instructions to receive, from the dealership server, the financing information including prospective financing terms for the at least one item, and display, via the interface hardware, the prospective financing terms in association with the at least one item.

Additional objects and advantages of the disclosed embodiments will be set forth in part in the description which follows, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed. For example, the methods relating to the disclosed embodiments may be implemented in system environments outside of the exemplary system environments disclosed herein.

BRIEF DESCRIPTION OF THE DRAWINGS

The accompanying drawings, which are incorporated in and constitute a part of this specification, illustrate various embodiments and aspects of the disclosed embodiments and, together with the description, serve to explain the principles of the disclosed embodiments. In the drawings:

FIG. 8 is an exemplary user interface for receiving buyer financial information that may be provided, consistent with disclosed embodiments;

FIG. 9 is an exemplary user interface for providing determined financial information about desired purchases to the prospective buyer that may be provided, consistent with disclosed embodiments;

FIG. 10 is an exemplary user interface for providing determined financial information about a desired purchase and adjustable loan terms to the prospective buyer that may be provided, consistent with disclosed embodiments;

FIG. 11 is an exemplary user interface for providing determined financial information about a desired purchase and selected loan terms to the prospective buyer that may be provided, consistent with disclosed embodiments.

DETAILED DESCRIPTION

Figure 1:
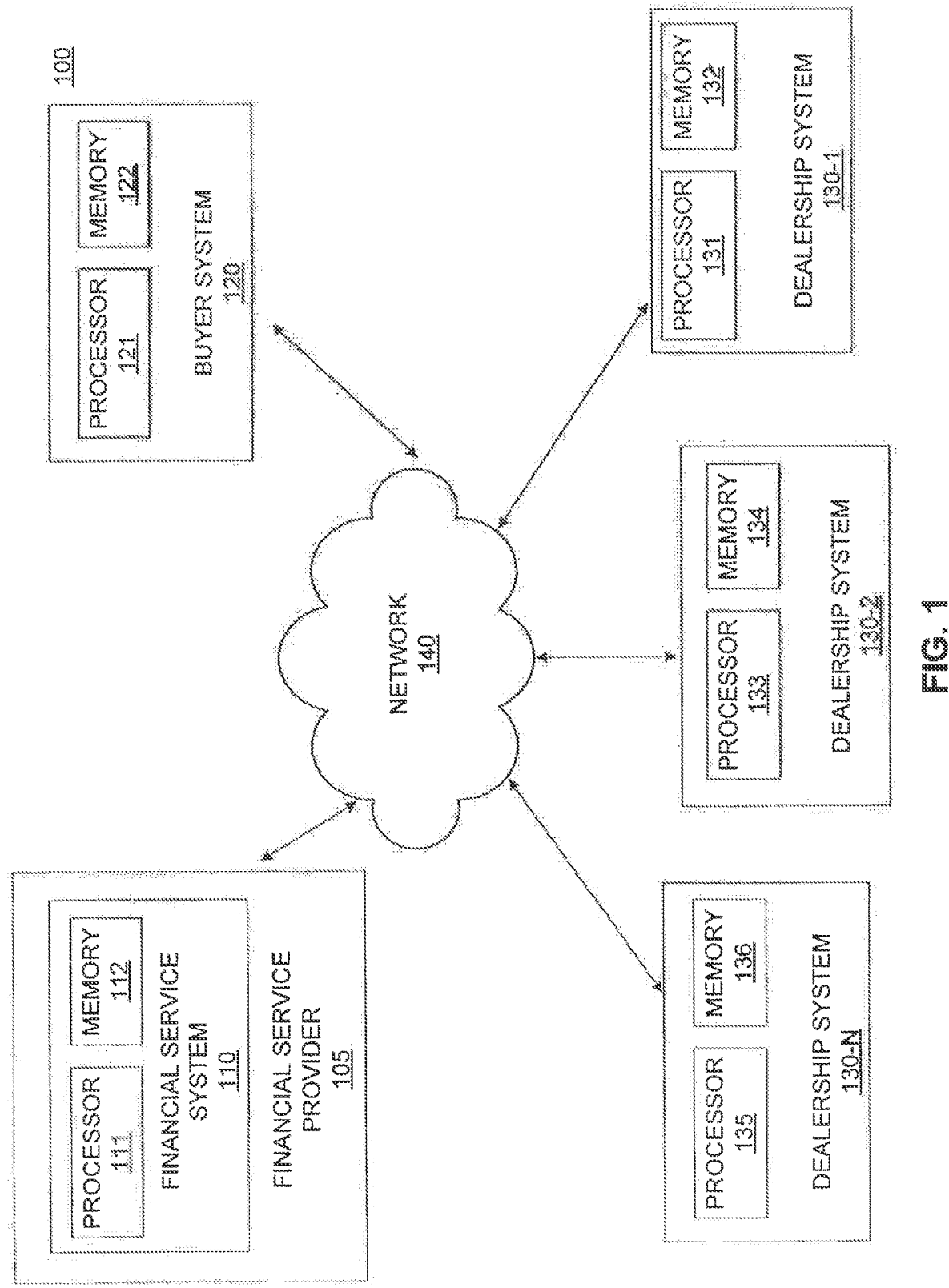
FIG. 1 illustrates an exemplary system consistent with disclosed embodiments.

Reference will now be made in detail to disclosed embodiments, examples of which are illustrated in the accompanying drawings. Wherever convenient, the same reference numbers will be used throughout the drawings to refer to the same or like parts.

Generally, disclosed embodiments are directed to systems and methods for providing financing options to a prospective buyer and, more particularly, providing a real-time application programming interface ("API") that may be used in conjunction with a web service to provide prospective buyers with the ability to shop on a website listing items for sale with enhanced information about a prospective buyer's approval status, loan terms, and the effect of the loan on their personal finances, such as the change in estimated cash flow resulting from an increased/decreased monthly payment based on historical spending and income patterns of the prospective buyer. In certain embodiments, a real-time API consistent with certain disclosed embodiments may use Representational State Transfer (REST) style architecture, and in this scenario, the real-time API may be called a RESTful API.

In certain embodiments, the real-time API may include a set of Hypertext Transfer Protocol (HTTP) request messages and a definition of the structure of response messages. In certain aspects, the API may allow a software application, which is written against the API and installed on a client (such as, for example, a computing device associated with a dealer) to exchange data with a server (such as, for example, a computing system associated with a financial service provider) that implements the API, in a request-response pattern. In certain embodiments, the request-response pattern defined by the API may be configured in a synchronous fashion, and require that the response be provided in real-time. In some embodiments, a response message from the server to the client through the API consistent with the disclosed embodiments may be in the format including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). Additionally or alternatively, the client may send GET and POST requests with JSON serialized parameters in the body. Preferably, the requests with JSON serialized parameters use "application/json" content-type. In another aspect, the API design may also require the server implementing the API return messages in JSON format in response to the request calls from the client.

For ease of discussion, embodiments may be described in connection with the sale of automotive vehicles and auto loans commonly used to finance their purchase. It is to be understood, however, that disclosed embodiments are not limited to the sale of vehicles and may, in fact, be applied to the sale, auctioning, leasing, etc. of any item, product, or service. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter.

FIG. 1 illustrates an exemplary system 100 consistent with disclosed embodiments. In one aspect, system environment 100 may include a financial service provider 105, financial service system 110, buyer system 120, one or more dealership systems 130, and network 140.

Financial service provider 105 may be one or more entities that configure, offer, provide, and/or manage financial service accounts, such as credit card accounts, debit card accounts, checking or savings accounts, loyalty accounts, and/or loan accounts. In one aspect, financial service provider 105 may include or be associated with financial service system 110 that may be configured to perform one or more aspects of the disclosed embodiments. In some embodiments, financial service system 110 may configure one or more loan accounts for users (i.e., prospective buyers), such as a user operating buyer system 120, using information pertaining to one or more additional financial service accounts provided by financial service provider 105 associated with financial service system 110.

Financial service system 110 may be one or more systems associated with one or more entities, such as financial service provider 105, that configure, offer, provide, and/or manage financial service accounts, such as credit card accounts, debit card accounts, checking or savings accounts, and loan accounts. Consistent with the disclosure, financial service system 110 may provide a loan account for financing a purchase to one or more users (i.e., prospective buyers) operating buyer system 120. In some embodiments, the loan account may be an automotive vehicle loan account. In some embodiments, financial service system 110 may receive loan requests from users (via, i.e., buyer system 120 and/or dealership system 130) relating to provided financial service accounts. In some embodiments, financial service system 110 may be configured to transmit financial information, such as that related to financial service accounts, creditworthiness, etc. related to one or more users operating buyer system 120 to one or more dealership systems 130 through an API to provide the prospective buyer a more informed shopping and research experience in preparation for a purchase. Financial service system 110 may be configured to assess the income, creditworthiness, risk, etc. associated with a prospective automobile buyer in real-time or substantially real-time, identify different financing packages depending on those assessments, and provide those financing packages to dealership systems 130 (via, e.g., the API). According to some embodiments, financial service system 110 may further receive inventory, pricing information associated with the inventor, and the like, to provide a listing of inventory items at the dealership associated with dealership system 130 meeting the identified financing packages.

Financial service system 110 may include one or more components that perform processes consistent with the disclosed embodiments. For example, financial service system 110 may include one or more computers (e.g., servers, database systems, etc.) configured to execute software instructions programmed to perform aspects of the disclosed embodiments, such as generating financial service accounts, maintaining accounts, processing information relating to accounts, etc. Financial service system 110 may also be configured to execute stored software instructions to implement the API for providing prospective buyers of an item requiring financing the ability to shop for the item on a website, such as a website associated with dealership system 130, listing items for sale with enhanced information, such as loan terms approved for financing one or more inventory items of dealership system 130, a listing of the one or more inventory items meeting the approved loan terms, and the like. Consistent with disclosed embodiments, financial service system 110 may include other components and infrastructure that enable it to perform operations, processes, and services consistent with disclosed embodiments. Consistent with disclosed embodiments, financial service system 110 may be configured to provide, manage, monitor, and assess a prospective financing program, such as an auto loan application process, for a purchase transaction involving buyer system 120, dealership system 130, or another component (shown or not shown) of system 100.

Buyer system 120 may represent a system associated with an entity seeking to buy an item from another party. Although the following description may refer to such an entity as an "individual," it is to be understood that the same description applies to multiple buyers acting in concert, corporate entity, or any other entity operating in the manner described herein. Buyer system 120 may include one or more components that perform processes consistent with the disclosed embodiments. For example, buyer system 120 may include one or more computers (e.g., servers, database systems, etc.) that are configured to execute software instructions programmed to perform aspects of the disclosed embodiments. One of ordinary skill in the art would recognize that buyer system 120 may include components and infrastructure that enable it to perform operations, processes, and services consistent with disclosed embodiments. For example, buyer system 120 may be configured to transmit and receive information associated with accessing a website, such as a website operated by dealership system 130 offering financing options for items listed on the website through an API associated with financial service provider system 110.

Dealership system(s) 130-1 through 130-N may represent one or more systems configured to receive, process, display, and transmit information associated with items for sale, for example, automotive vehicles. In some embodiments, multiple dealership systems 130 may be configured to access common inventory listing databases (not shown) containing listing information relating to vehicles for sale or lease. Dealership systems 130 may be owned by the same entity or different entities. Dealership system(s) 130 may be associated with the seller of the vehicles (i.e., a typical car dealership) or a third-party to the sale (i.e., Kelley Blue Book™, Cars.com™, etc.). Dealership system(s) 130 may include components and infrastructure that enable it to perform operations, processes, and services consistent with disclosed embodiments, such as providing websites that offer vehicle listings, and communicating with financial service system 110 or other components through an API to provide financing options associated with those vehicle listings.

Consistent with disclosed embodiments, components of system 100, including financial service system 110, buyer system 120, and dealership system(s) 130, may include one or more processors (such as processors 111, 121, 131, 133, or 135) as shown in exemplary form in FIG. 1. The processors may be, for example, one or more of a microprocessor from the Pentium™ family manufactured by Intel™ or the Turion™ family manufactured by AMD™. The processor may include a single core or multiple core processor system that provides the ability to perform parallel processes simultaneously. For example, the processors may be single core processors configured with virtual processing technologies known to those skilled in the art. In certain embodiments, the processors may use logical processors to simultaneously execute and control multiple processes. The processors may implement virtual machine technologies, or other similar known technologies to provide the ability to execute, control, run, manipulate, store, etc. multiple software processes, applications, programs, etc. In some embodiments, the processors may include a multiple-core processor arrangements (e.g., dual or quad core) configured to provide parallel processing functionalities to enable computer components of financial service system 110, buyer system 120, and/or dealership system(s) 130 to execute multiple processes simultaneously. Other types of processor arrangements could be implemented that provide for the capabilities disclosed herein. Moreover, the processors may represent one or more servers or other computing devices that are associated with financial service system 110, buyer system 120, and/or dealership system(s) 130. For instance, the processors may represent a distributed network of processors configured to operate together over a local or wide area network. Alternatively, the processors may be a processing device configured to execute software instructions that receive and send information, instructions, etc. to/from other processing devices associated with financial service provider 110 or other components of system environment 100. In certain aspects, processors 111, 121, 131, 133, and 135 may be configured to execute software instructions stored in memory to perform one or more processes consistent with disclosed embodiments. Moreover, processors 111, 121, 131, 133, and 135 may execute one or more programs located remotely from financial service system 110, buyer system 120, or dealership systems 130, respectively.

Consistent with disclosed embodiments, components of system 100, including financial service system 110, buyer system 120, and dealership system(s) 130, may also include one or more memory devices (such as memories 112, 122, 132, 134, and 136) as shown in exemplary form in FIG. 1. The memory devices may store software instructions that are executed by processors 111, 121, 131, 133, and 135, such as one or more applications, network communication processes, operating system software, software instructions relating to the disclosed embodiments, and any other type of application or software known to be executable by processing devices. The memory devices may be a volatile or non-volatile, magnetic, semiconductor, tape, optical, removable, nonremovable, or other type of storage device or non-transitory computer-readable medium. The memory devices may be two or more memory devices distributed over a local or wide area network, or may be a single memory device. In certain embodiments, the memory devices may include database systems, such as database storage devices, including one or more database processing devices configured to receive instructions to access, process, and send information stored in the storage devices. By way of example, database systems may including Oracle™ databases, Sybase™ databases, or other relational databases or non-relational databases, such as Hadoop sequence files, HBase, or Cassandra.

In some embodiments, financial service system 110, buyer system 120, and dealership system(s) 130 may also include one or more additional components (not shown) that provide communications with other components of system environment 100, such as through network 140, or any other suitable communications infrastructure.

Network 140 may be any type of network that facilitates communications and data transfer between components of system environment 100, such as, for example, financial service system 110, buyer system 120, and dealership system(s) 130. Network 140 may be a Local Area Network (LAN), a Wide Area Network (WAN), such as the Internet, and may be a single network or a combination of networks. Further, network 140 may reflect a single type of network or a combination of different types of networks, such as the Internet and public exchange networks for wireline and/or wireless communications. Network 140 may utilize cloud computing technologies that are familiar in the marketplace. Moreover, any part of network 140 may be implemented through traditional infrastructures or channels of trade, to permit operations associated with financial accounts that are performed manually or in-person by the various entities illustrated in FIG. 1. Network 140 is not limited to the above examples and system 100 may implement any type of network that allows the entities (and others not shown) included in FIG. 1 to exchange data and information.

Although FIG. 1 describes a certain number of entities and processing/computing components within system environment 100, any number or combination of components may be implemented without departing from the scope of the disclosed embodiments. For example, dealership systems 130 may interact with users described as associated with buyer system 120 through systems available to the users at brick-and-mortar locations associated with dealership system 130, such as computers provided by the brick-and-mortar to access vehicle inventory. Additionally, financial service system 110, buyer system 120, and dealership system(s) 130 are not mutually exclusive. For example, in one disclosed embodiment, financial service system 110 and one or more dealership systems 130 may be the same entity or partnered with one another. The entities as described are not limited to their discrete descriptions above. Further, where different components of system environment 100 are combined (e.g., financial service system 110 and one or more dealership systems 130, etc.), the computing and processing devices and software executed by these components may be integrated into a local or distributed system.

Figure 2:
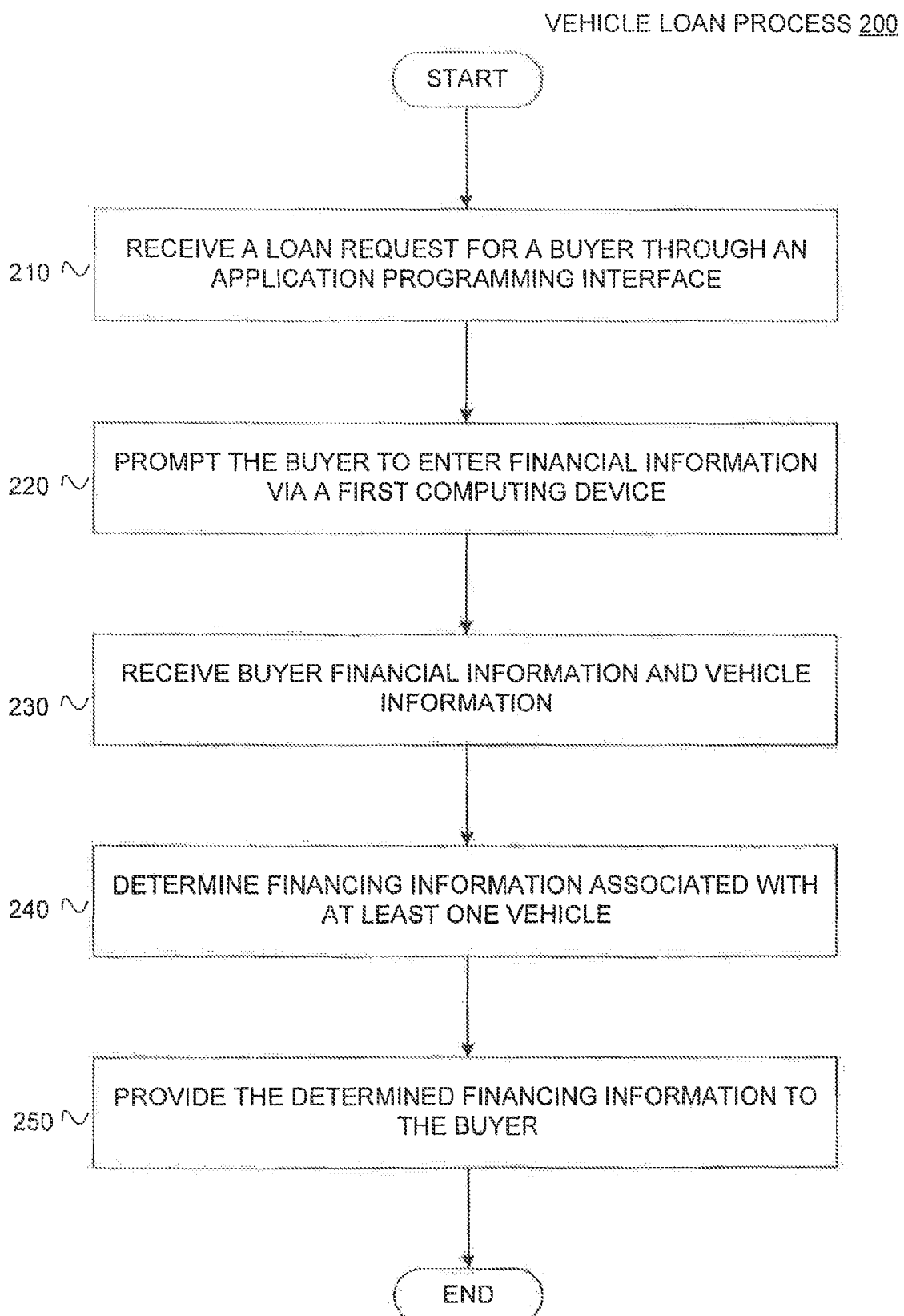
FIG. 2 is a flowchart of an exemplary vehicle loan process, consistent with disclosed embodiments.

As explained, the disclosed embodiments include methods and systems for providing a real-time API for providing prospective buyers of an item requiring financing the ability to shop for the item on a website listing items for sale with enhanced information about loan terms approved for financing one or more inventory items of dealership system 130, a listing of the one or more inventory items meeting the approved loan terms, and the like. FIG. 2 shows a flowchart of an exemplary vehicle loan process 200 consistent with certain disclosed embodiments. One or more steps of vehicle loan process 200 may be provided through the real-time API configured in accordance with the disclosed embodiments. In some embodiments, dealership system(s) 130 may receive an indication that a user, such as a prospective buyer operating buyer system 120, is interested in pursuing financing for purchase of one or more items listed on a website associated with dealership system(s) 130. For example, a prospective buyer (via, e.g., buyer system 120) may interact with an automotive dealership website to identify one or more vehicles listed on the website that the prospective buyer may want to purchase. In some embodiments, the prospective buyer may interact (via, e.g., buyer system 120) with a portion of the dealership website offering financing for the vehicles listed on the website through an API associated with one or more financial service providers. Through the real-time API, financial service system 110 may receive a loan request for the prospective buyer (Step 210). In one aspect, the stem may be a vehicle listed on a website associated with dealership system(s) 130, and the requested financing may comprise financing associated with an auto loan for the vehicle. For example, the prospective buyer may interact with a portion of the dealership website to request financing for the one or more identified vehicles from the dealership website.

The prospective buyer may be prompted, through buyer system 120, to enter or otherwise provide financial information associated with the prospective buyer (Step 220). In some embodiments, receiving the loan request in Step 210 and prompting the prospective buyer to enter financial information in Step 220 may occur substantially simultaneously. In alternative embodiments, prompting the prospective buyer to enter financial information may occur at a later time following receipt of the loan request. In some embodiments, financial information may relate to loan criteria and buyer loan optimization preferences, which may affect loan terms. Information relating to loan criteria may help financial service provider 105 evaluate the risk of the loan and may include details about the prospective buyer and/or the item to be purchased. For example, information relating to loan criteria may include the automobile make(s), model(s), trim package, and year(s), the Vehicle Identification Humber(s) (VIN), proof of income, proof of insurance, back-end product information, trade-in equity, vehicle mileage, and the like. Back-end product information includes features or additional stems that may be purchased in connection with the item to be purchased. For example, back-end product information may include tire protection, paint rust proofing coat, extra warranty on the automobile, gap insurance (i.e., insurance that covers gaps between coverage), and/or other costs potentially adding to the requested loan amount.

A prospective buyer may also have loan optimization preferences, such as prioritizing the interest rate, total monthly payment, number of payments, down payment, or other loan factors over remaining factors. The prospective buyer's loan preferences may be used to tailor the loan terms to the prospective buyer's preferences, making the loan terms more attractive to the prospective buyer and offering multiple financing options for identified vehicles. Financial service system 110 may additionally be configured to perform a verification step (not shown) in which financial service system 110 may request verification of the information received in Step 220. For example, financial service system 110 may require one or more components of system 100 to submit additional information, or to stipulate to the veracity of any and all information previously received. For example, financial service system 110 may receive verifying financial information (i.e., proof of income, etc.) from buyer system 120 and verifying item information (i.e., particulars regarding the underlying vehicle) from dealership system(s) 130 (Step 230) via the real-time API. Alternatively or additionally, financial service system 110 may receive the verifying financial information from buyer system 120 and/or verifying item information from dealership system(s) 130 via telephonic, postal, and/or other electronic means.

Financial service system 110 may also determine financing information associated with the at least one item (Step 240). A financial service provider may use databases and/or software to evaluate the risk of a loan and calculate loan terms. By comparing the information provided in a loan request, buyer financial information, and vehicle information with data, including information provided by other customers and profitability of loans provided to those customers, a financial service provider may determine appropriate loan terms (or sets of loan terms) to maintain profitability and stay within the potential buyers purchase capacity. Thus, loan terms and other financing information may be determined based on various information included in the loan request, buyer financial information, vehicle information, and/or other information (e.g., information regarding the car, the buyer, the dealer, the general economy, the financial service providers desired profit level for the loan or loans in general etc.). In some embodiments, a series of loan terms (i.e., multiple permutations of loan duration, rate, loan-to-value, etc.) may be calculated under which determined financing information may be provided to the buyer. Financial service system 110 or another computer device may be used to determine the financing information, and corresponding loan terms, associated with the item (i.e., the vehicle(s) identified on the dealership's website) to be purchased. In one embodiment, determining financing information associated with the at least one item may include determining an interest rate, loan duration, payment frequency, payment amount, and any fees associated with the loan.

Financial service system 110 may optionally prepare and provide the determined financing information to dealership system 130 through the real-time API (Step 250). The financing information may, in turn, be provided by dealership system 130 to buyer system 120 for presentation to the prospective buyer. In some embodiments, the determined financing information may be integrated with item listings on the website associated with dealership system(s) 130, as viewed by the prospective buyer through buyer system 120. For example, a listing of one or more vehicles listed on the website associated with dealership system(s) 130 may include corresponding determined financing information in terms of, for example, monthly payments at a particular interest rate for each of the listed one or more vehicles. In some embodiments, receiving the buyer loan request in Step 210 and providing the determined financing information in Step 250 may occur substantially at the same time. In alternative embodiments, the determined financing information may be provided to the buyer at a time subsequent to receiving the loan request from the prospective buyer.

Figure 3:
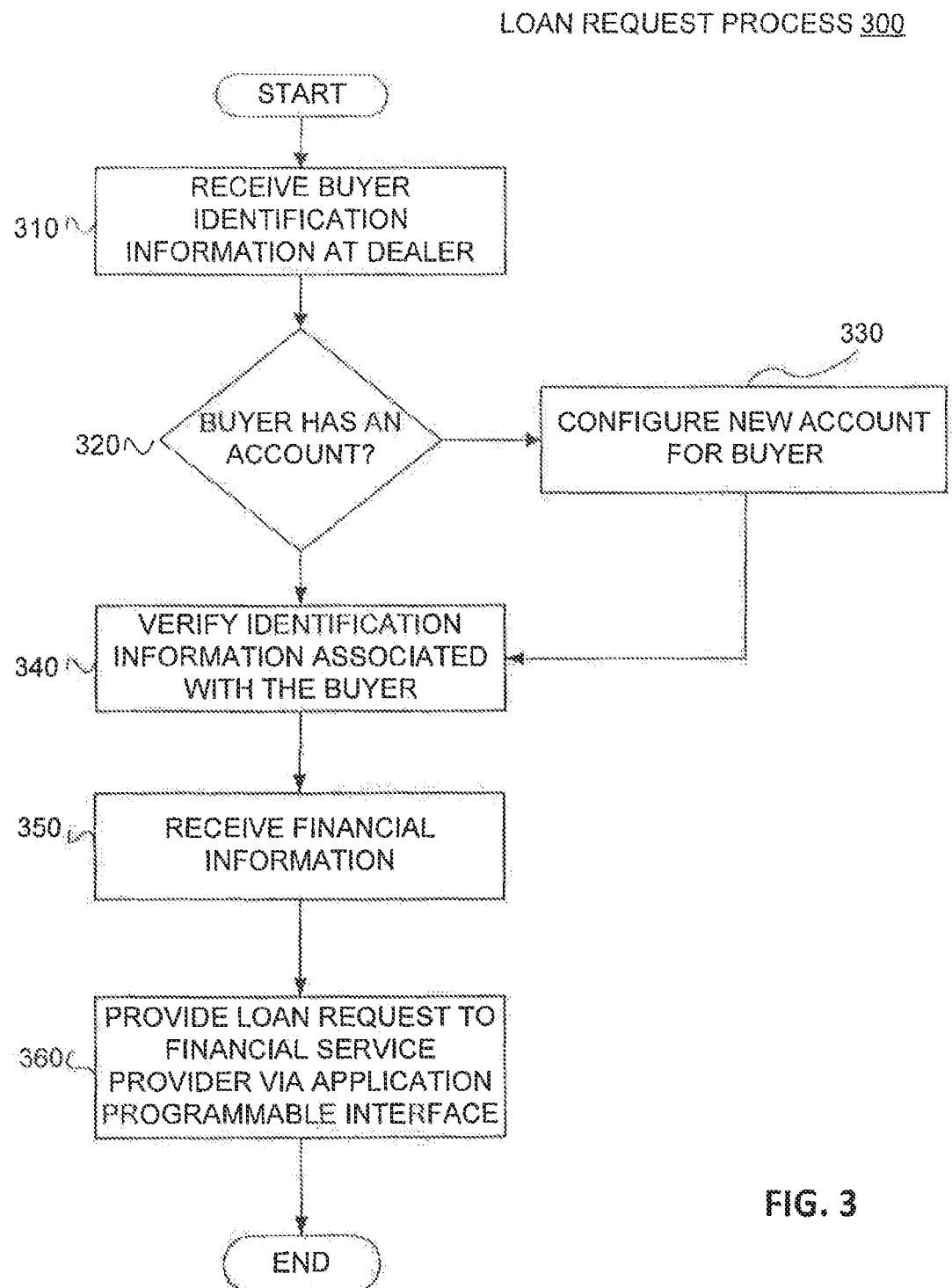
FIG. 3 is a flowchart of an exemplary loan request process, consistent with disclosed embodiments.

FIG. 3 illustrates an exemplary loan request process 300 consistent with disclosed embodiments. As an example, FIG. 3 is disclosed in connection with dealership system(s) 130, but it is understood that other components may perform one or more aspects of loan request process 300, such as financial service system 110. In some embodiments, dealership system(s) 130 may receive buyer identification information (Step 310) from, for example, a user (i.e., a prospective buyer) operating buyer system 120. For example, the buyer identification information may comprise a username and password combination associated with a user account for using a personalized version of the dealership website associated with dealership system(s) 130. Such a user account may be referred to as a dealership system account. In other embodiments, the buyer identification information may comprise a registration request for a dealership system account. Dealership system(s) 130 may determine if the buyer associated with buyer system 120 has a previously configured account on the website or websites associated with dealership system(s) 130 (Step 320).

Dealership system(s) 130 may determine whether a prospective buyer of an item is associated with an existing dealership system account (Step 320). In some embodiments, the prospective buyer may be the user operating buyer system 120. In some embodiments, the existing dealership system account may be an account provided by dealership system(s) 130. Dealership system(s) 130 may determine whether the prospective buyer has an existing account by accessing internal memory 132, an associated internal database (not shown), an external storage device via network 140, etc. storing username and password combinations associated registered users of the dealership website to verify the received buyer identification information.

If dealership system(s) 130 determines that the prospective buyer does not have a dealership system account (Step 320: NO), dealership system(s) 130 may configure a new dealership system account for the prospective buyer (Step 330). The new dealership system account may be configured based on the buyer identification information described in connection with Step 310. In some embodiments, dealership system(s) 130 may prompt the prospective buyer (via, e.g., buyer system 120) for relevant information as part of configuring the new account. Information required to configure the account may include, as a non-limiting example, one or more of a name, an address, contact information, government information, and a password. It is understood that this list of information is exemplary only, and that for any given prospective buyer, dealership system(s) 130 may seek or require more or less information in order to configure a new account.

If dealership system(s) 130 determines that the prospective buyer does have a dealership system account (Step 320: YES), or if a new account is configured as part of Step 330, dealership system(s) 130 may verify various details and information relating to the dealership system account (Step 340). In some embodiments, dealership system(s) 130 may verify the account by prompting buyer system 120 to transmit corroborating documents. In other embodiments, financial service system 110 may verify the account by corroborating information via a third party over network 140. The third party may be, for example, a government database, or any other source of information that may contain information associated with the prospective buyer. In alternative embodiments, dealership system(s) 130 may verify the account by prompting the user to re-enter a previously created and stored password or answering a previously created and stored security question.

Dealership system(s) 130 may receive buyer financial information typically required in order to provide loan information (Step 350). In some embodiments, when the prospective buyer requests financing for one or more items on the dealership website, this information need not be re-entered by the user. Additionally or alternatively, the received buyer financial information may be provided to financial service system 110 (via, e.g., an API) for determining pre-approved loan terms allowing dealership system 130 to provide a personalized experience on the dealership website. For example, dealership system 130 may generate financing options personalized to the prospective buyer's according to the pre-approved loan terms without the prospective buyer requesting financing information.

The buyer financial information received at step 350 may vary depending on several factors, including but not limited to legal requirements of the geographical jurisdiction, financial history of the prospective buyer, parameters of the financial service provider 105, whether the prospective buyer is seeking to buy or lease the vehicle/item, time constraints, availability of the information, prior experience with the prospective buyer, etc. In some embodiments, the determination of information required may be made based on prior loans provided by financial service system 110.

The buyer financial information may also relate to loan criteria and buyer loan optimization preferences, which may affect loan terms. Information relating to loan criteria may help financial service provider 105 evaluate the risk of the loan and may include details about the buyer and/or an item to be purchased. For example, information relating to loan criteria may include the automobile make, model, and year, the VIN, proof of income, proof of insurance, and/or back-end product information, if known. A buyer may also have loan optimization preferences, such as optimizing the interest rate, total monthly payment, or number of payments or varying the down payment. The buyer's loan preferences may be used to tailor the loan terms to the buyer's preferences, making the loan terms more attractive to the prospective buyer. It is understood that the financial information required may vary and more or less information may be requested in order to determine and provide financing information.

In some embodiments, dealership system(s) 130 may provide the loan request to financial service system 110 via the real-time API upon receiving a loan request via, e.g., the dealership website (Step 360). In some embodiments, the loan request may include buyer identification information associated with the prospective buyers dealership system account and received buyer financial information. In alternative embodiments, the loan request may be limited to a prospective buyer's request for a loan, and dealership system (s) 130 may provide received buyer financial information to financial service system 110 at a later time. In one aspect, when financial service system 110 prompts the prospective buyer to enter financial information in Step 220, dealership system(s) 130 may provide received buyer financial information associated with the prospective buyer, which may be stored in the prospective buyer's dealership system account. Further, dealership system(s) 130 may provide (via, e.g., the API) information associated with one or more items (i.e., automotive vehicles) selected by the prospective buyer on the dealership website.

Figure 4:
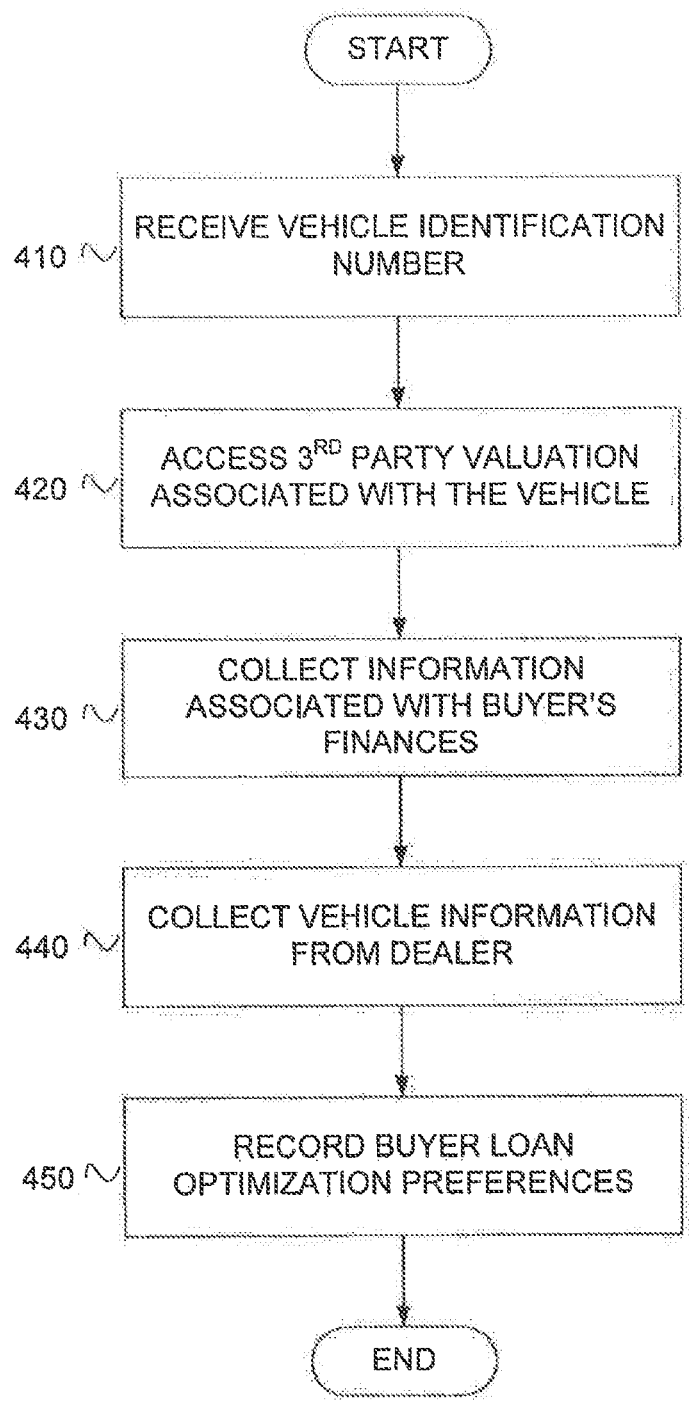
FIG. 4 is a flowchart of an exemplary loan information collection process, consistent with disclosed embodiments.

FIG. 4 illustrates an exemplary loan information collection process 400, consistent with disclosed embodiments. As an example, FIG. 4 is disclosed in connection with financial service system 110, but it is understood that other components may perform processes to coiled various types of information from a prospective buyer, such as dealership system(s) 130. In some embodiments, loan information collection process 400 may be similar to receiving buyer financial information and vehicle information in Step 230. Through a loan request, and by providing buyer financial information and vehicle information, a buyer may provide financial service provider 105 with information relating to loan criteria, including VIN, third party valuation of the item for purchase, information associated with the buyer's finances, vehicle information, and buyer loan optimization preferences, which the financial service provider may use to process and categorize the prospective buyer's request and to provide loan terms to the prospective buyer.

As shown in Step 410, financial service system 110 may receive one or more VINs associated with item(s) the prospective buyer wishes to finance. Financial service provider 105 may use the VIN(s) to determine details associated with the item affecting the value, depreciation rate, etc. Financial service provider 110 may receive the VIN via the real-time API from dealership system 130.

As shown in Step 420, financial service system 110 may access third party valuation systems regarding the item to be purchased. For example, financial service system 100 may access, consult, or otherwise interact with third party systems associated with entities that evaluate, monitor, and/or estimate the value of automotive vehicles, such as Kelley Blue Book™, do determine the average depreciation rate for the type of vehicle the prospective buyer wishes to finance. Financial service system 110 may access the third party valuation associated with the item to be purchased via telephonic, postal, or electronic communications, such as via network 140.

As shown in Step 430, financial service system 110 may receive, access, or otherwise collect information associated with the buyer's finances. In some embodiments, the prospective buyer (via, e.g., buyer system 120) may provide information associated with the buyers finances, including proof of the prospective buyer's income and insurance, to dealership system 130 and/or via the real-time API to financial service system 110. For example, the prospective buyer may take a picture of a document proving income or insurance and use buyer system 120 to provide the picture to financial service provider 105. Financial service provider 105 may use the prospective buyer's income and insurance to better assess the risk of the loan, which may enable providing more competitive loan terms to the buyer. Additionally or alternatively, financial service system 110 may receive or access information associated with the prospective buyer's finances from internal memory (i.e., access financial records associated with an account provided by financial service provider 105 to the prospective buyer), from another financial service provider, and/or from another third party having access to information relevant to the user's finances (such as, for example, a credit bureau).

As shown in Step 440, financial service provider 105 may collect vehicle information from dealership system(s) 130 (via, e.g., the API), which may include the condition of the vehicle and offered back-end product information. Financial service provider 105 may use the vehicle information, including the condition of the vehicle and back-end product information, to better assess the value of an item to be purchased and the risk of the loan, which may enable providing more competitive loan terms to the buyer. Financial service provider may collect vehicle information, including vehicle condition and back-end product information, via financial service system 110. Alternatively or additionally, buyer system 120 may provide vehicle information to financial service system 110. For example, the buyer may select desired back-end product information associated with a portion of the dealership website offering financing, which may be provided to financial service provider system 110 through the real-time API.

As shown in Step 450, financial service provider 105 may record the prospective buyer's loan optimization preferences, which may include preferences regarding the interest rate, total monthly payment, number of payments, or varying the down payment. Based on these loan optimization preferences, financial service system 110 may tailor a set of loan terms to the buyer, making loan terms included in the determined financing information more attractive to the prospective buyer. The prospective buyer may provide (via, e.g., via buyer system 120) the prospective buyer's loan optimization preferences through, for example, a portion of the dealership website, which may be provided to financial service provider 110 via the real-time API.

Figure 5:
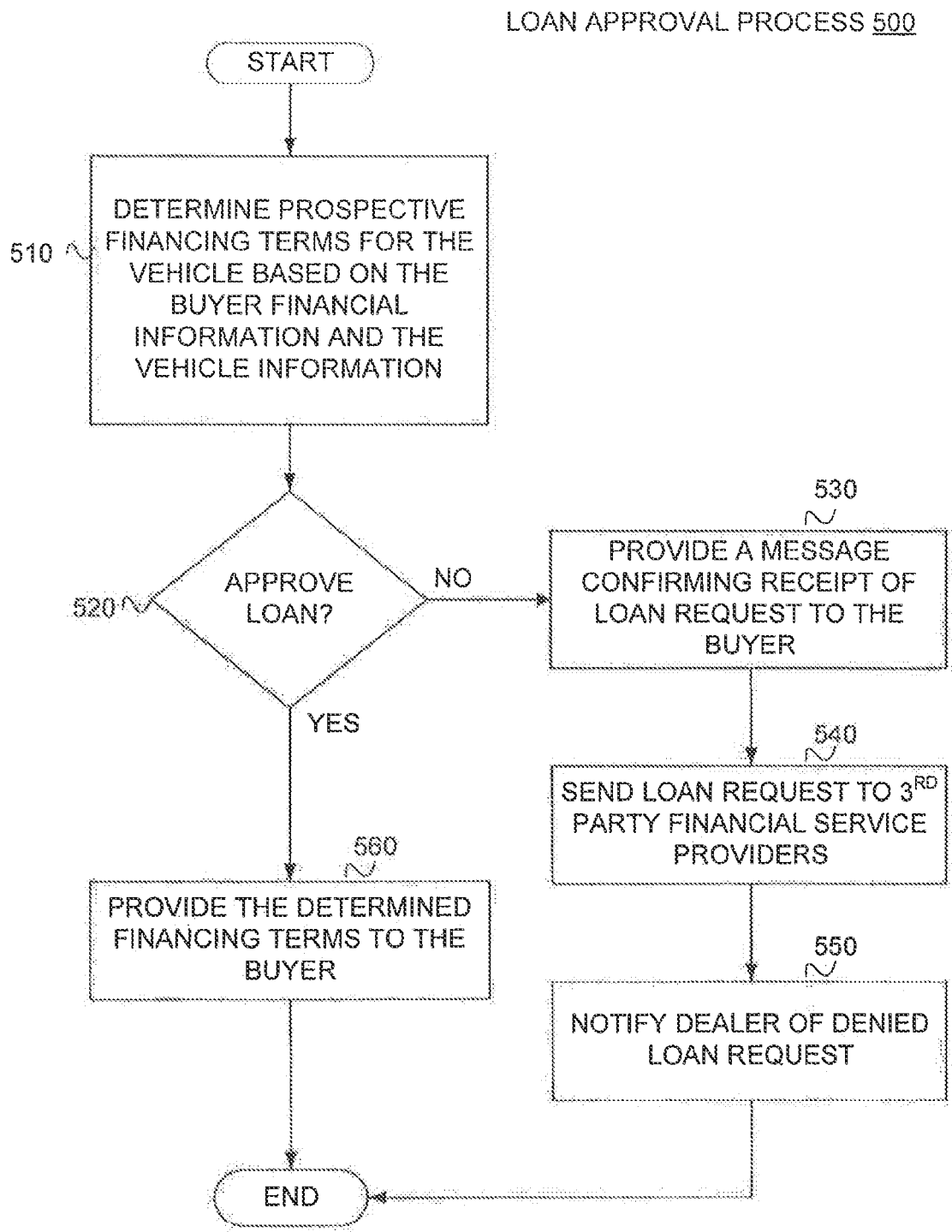
FIG. 5 is a flowchart of an exemplary loan approval process, consistent with disclosed embodiments.

FIG. 5 illustrates an exemplary loan approval process 500, consistent with disclosed embodiments. As an example, FIG. 5 is disclosed in connection with financial service system 110. In some embodiments, loan approval process 500 may correspond to determining financing information associated with an item in Step 240. After receiving buyer financial information and vehicle information, financial service provider 110 may determine prospective financing terms for the item or items (Step 510). For example, financial service provider 110 may determine a set of loan terms responsive to the loan request based on the vehicle value, the prospective buyer's creditworthiness, the prospective buyer's loan optimization preferences, etc. Financial service provider 105 may decide whether to approve a loan for the buyer (Step 520). If financial service provider 105 does not approve a loan associated with the item to be purchased for the buyer (Step 520: NO), financial service system 110 may provide a message confirming receipt of the buyer's loan request (Step 530) have a prior account, send the loan request to third party financial service providers (Step 540), and notify the dealer of the denied loan request (Step 550). If financial service provider 105 does approve a loan associated with the item to be purchased for the prospective buyer (Step 520: YES), financial service system 110 may provide the determined financing information to the prospective buyer (Step 560).

Financial service system 110 may determine prospective financing terms for the item to be purchased based on received buyer financing information and vehicle information (Step 510). For example, financial service provider 110 may determine a set of loan terms responsive to the loan request based on the vehicle value, the prospective buyer's creditworthiness, the prospective buyer's loan optimization preferences, etc. Financial service provider 110 may use databases and/or software to evaluate the risk of a loan and calculate an approval decision and, if approved, loan terms. Thus, loan terms and other financing information may be determined based on various information included in the loan request, buyer financial information, and vehicle information or elsewhere (e.g., information regarding the car, the buyer, the dealer, the general economy, the financial service provider's desired profit level for the loan or loans in general, etc.). Financial service provider 110 may further identify the profitability associated with loans provided to other potential buyers requesting a loan via the dealership website. In one embodiment, determining financing information associated with the at least one item may include determining an interest rate, loan duration, payment frequency, payment amount, and any fees associated with the loan. In some embodiments, a series of loan terms (i.e., multiple permutations of loan duration, rate, loan-to-value, etc.) may be calculated under which determined financing information may be provided to the prospective buyer.

If financial service provider 110 determines to approve the loan associated with an item to be purchased for the prospective buyer (Step 520: YES), financial service system 110 may optionally prepare and provide the determined financing terms to dealership system 130 and/or buyer system 120 through the real-time API (Step 560). In some embodiments, the determined financing terms may be integrated with item listings on the website associated with dealership system(s) 130, as viewed by a user through buyer system 120. In one aspect, the determined financing terms may appear as monthly payments at a particular interest rate for one or more vehicles listed on the website associated with dealership system(s) 130. Providing the determined financing information to dealership system 130 and/or buyer system 120 will be discussed in further detail below, including in connection to FIGS. 9-11.

If financial service system 110 determines not to approve a loan for the prospective buyer (Step 520: NO), financial service system 110 may provide a message confirming receipt of the buyer's loan request to the buyer (Step 530). The notification message may, for example, provide feedback to the prospective buyer that system 100 is operating correctly and provide time in which financial service system 110 contact the prospective buyer. Financial service provider 110 may determine not to approve of a particular loan for a variety of reasons, including the determined risk of the loan or anticipated profitability for financial service provider 105. Additional detail regarding a determination not to approve the loan and the corresponding notification will be discussed in further detail in connection with FIG. 12.

In some embodiments, financial service provider 110 may determine not to approve a loan for the prospective buyer in connection with a first vehicle, but determine to approve a loan for the prospective buyer in connection with a second vehicle. For example, financial service provider 110 may determine not to approve a loan for the prospective buyer for a vehicle outside of a make, model, or vehicle year criteria, but approve a loan for the prospective buyer for a vehicle that meets those criteria. In another example, financial service provider 110 may determine to approve a loan for the prospective buyer up to a maximum amount, which can be applied to any vehicle meeting those criteria, with different loan terms applying to different vehicles. In some embodiments, the prospective buyer may have requested financing in connection with only the first vehicle. In other embodiments, the prospective buyer may have requested financing options associated with a plurality of inventory items, such as a class or type of vehicle, including the first and second vehicles. Financial service system 110 may provide the message confirming receipt of the loan request to the buyer, for example, through the website associated with dealership system 130 via the real-time API. The prospective buyer may receive the message confirming receipt of the loan request through the real-time API via buyer system 120.

After providing a message confirming receipt of the loan request to the buyer (Step 530), financial service system 110 may send the loan request to third party financial service providers via telephonic, postal, or electronic means, including via network 140. Loan request information may include ail of the information received by financial service system 110 in connection with the loan request, including buyer identification, buyer financial information, and vehicle information. By providing the loan request to third party financial service providers, financial service provider may enable other financial service providers to determine whether to provide financing terms to the buyer. Financial service provider 110 may notify dealership system 130 of the denied loan request (Step 550) and of sending the loan request to third party financial service providers (Step 540).

Figure 6:
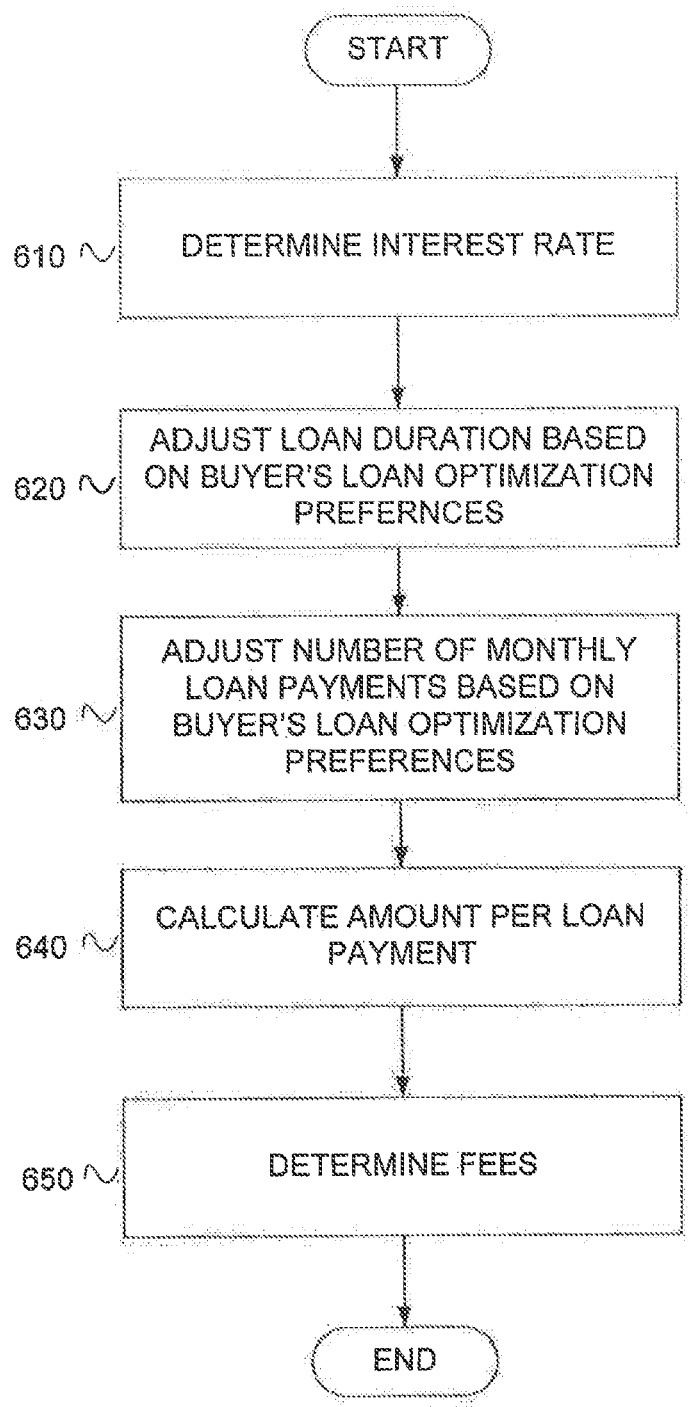
FIG. 6 is a flowchart of an exemplary loan terms generation process, consistent with disclosed embodiments.

FIG. 6 shows an exemplary loan terms generation process 600, consistent with disclosed embodiments. As an example, FIG. 5 is disclosed in connection with financial service system 110. In some embodiments, one or more aspects of loan terms generation process 600 may be correspond to Step 240 and Step 510, discussed above. Based on the received loan request, buyer financial information, and vehicle information, financial service provider 105 may determine prospective financing information associated with the item to be purchased, including interest rate, loan duration, number of monthly loan payments, amount per loan payment, fees, etc.

As shown in Step 610, financial service system 110 may determine an interest rate. Financial service system 110 may be configured to take data collected from other customers and determine an appropriate interest rate that, in combination with other loan terms, may maintain profitability for financial service provider 105 (i.e., avoid customer defaults).

As shown in Step 620, financial service system 110 may adjust the loan duration based on the buyer's loan optimization preferences. Financial service system 110 may be configured to take data collected from other customers and appropriately adjust the loan duration such that, in combination with other loan terms, the adjusted loan duration may maintain profitability for financial service provider 105.

As shown in Step 630, financial service system 110 may adjust the number of monthly payments based on the buyer's loan optimization preferences. Financial service system 110 may be configured to take data collected from other customers, including those who obtained loans through the dealership website using the API, and appropriately adjust the number of monthly payments such that, in combination with other loan terms, the number of monthly payments may maintain profitability for financial service provider 105.

As shown in Step 640, financial service system 110 may calculate an amount per loan payment. Financial service system 110 may be configured to take data collected from other customers and calculate an appropriate amount per loan payment that, in combination with other loan terms, may maintain profitability for financial service provider 105.

As shown in Step 650, financial service system 110 may determine fees, which may relate to fees associated with a loan such as loan origination fees, tax tag fees, title fees, documentation fees, and delivery preparation fees. Financial service system 110 may be configured to take data collected from other customers and determine appropriate fees that, in combination with other loan terms, may maintain profitability for financial service provider 105.

Figure 7:
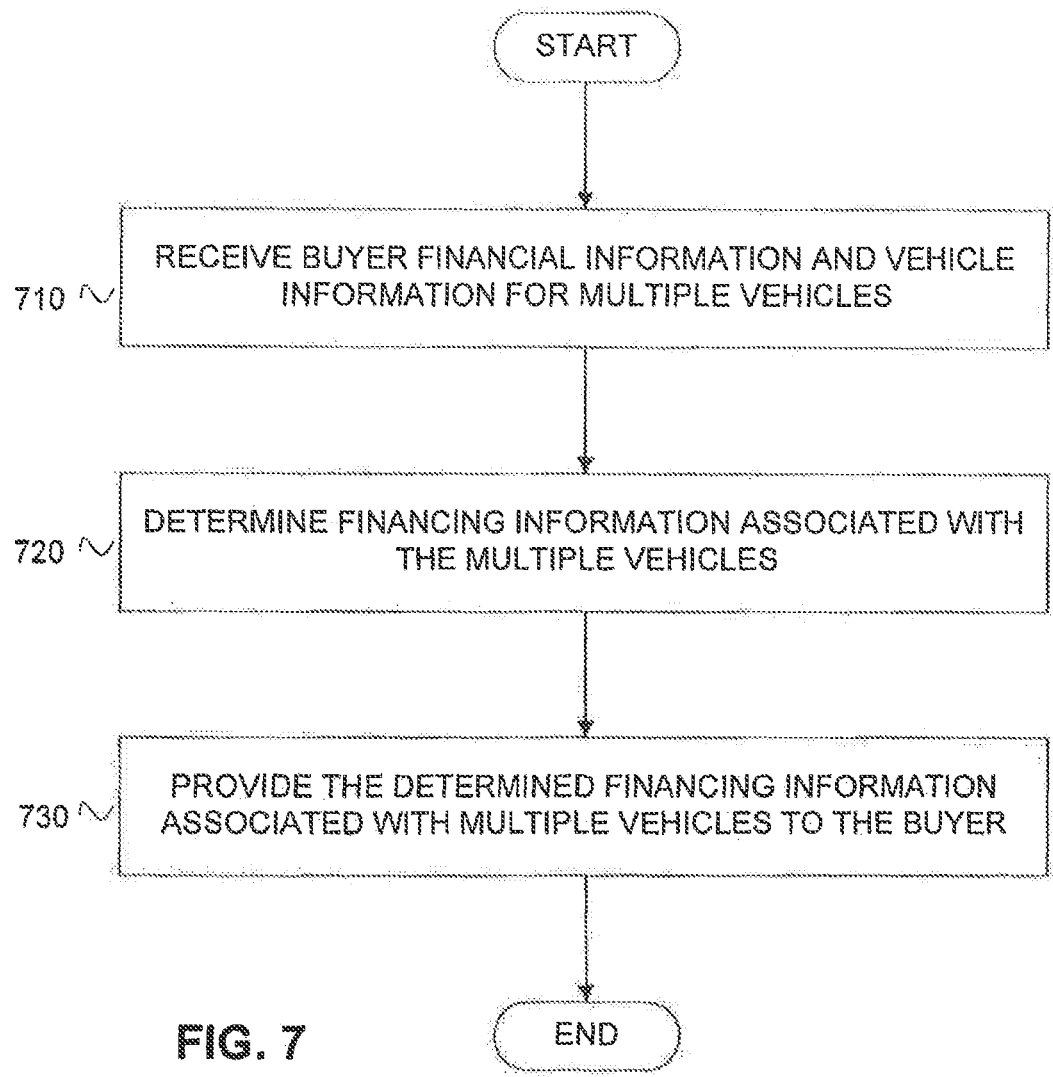
FIG. 7 is a flowchart of an exemplary multiple vehicle loan process, consistent with disclosed embodiments.

FIG. 7 shows an exemplary multiple vehicle loan process 700, consistent with disclosed embodiments. In some embodiments, multiple vehicle loan process 700 may include steps similar to receiving buyer financial information and vehicle information (Step 230), determining financing information (Step 240), and providing the determined financing information to the prospective buyer (Step 250) of vehicle loan process 200. Through the real-time API, financial service system 110 may receive buyer information and item information for multiple items from a buyer (Step 710). For example, the prospective buyer may select several vehicles in which the prospective buyer is interested in purchasing from the dealership website. Upon receiving the buyer information and item information for multiple items, financial service system 110 may determine financing information associated with the multiple items (Step 720). Financial service system 110 may provide the determined financing information associated with multiple vehicles to the prospective buyer (Step 730).

As shown in Step 710, financial service system 110 may receive buyer financial information, as discussed in Steps 220 and 230, and vehicle information for multiple vehicles. In one embodiment, financial service system 110 may establish loan terms for each vehicle independently. Alternatively, financial service system 110 may establish loan terms for different classes of vehicles. For example, luxury vehicles with a value listed between $30,000 and $35,000 may be evaluated together as a class. Vehicle information for each vehicle or class of vehicles may help financial service provider 105 evaluate the risk of each loan and affect loan terms. For example, information relating to loan criteria may include each vehicle's make, model, year, VIN, and back-end product information, as well as the buyer's proof of income and proof of insurance. Financial service system 110 may receive the prompted-for financial information from buyer system 120 and item information from dealership system(s) 130 (Step 230) via the real-time API. Alternatively, in another embodiment financial service system 110 may receive the prompted-for financial information from buyer system 120 and item information from dealership system(s) 130 or the additional information via telephonic, postal, or electronic means. In another aspect, the prospective buyer may provide vehicle information for each vehicle to financial service system 110.

Upon receiving buyer financial information and vehicle information in Step 710, financial service system 110 may determine financing information associated with each item or class of items (Step 720). Financial service system 110 may use databases and/or software to evaluate the risk of a loan and calculate loan terms as discussed in Step 240. In one embodiment, determining financing information associated with the multiple items may include determining an interest rate, loan duration, payment frequency, payment amount, and any fees associated with the loan for each stem or class of items to be purchased.

Financial service system 110 may optionally prepare and provide the determined financing information associated with multiple items to buyer system 120 through the real-time API (Step 730). In some embodiments, the determined financing information may be integrated with item listings on the website associated with dealership system(s) 130, as viewed by a prospective buyer through buyer system 120. In one aspect, the prospective buyer may be able to sort items on the website associated with dealership system(s) 130 based on items for which determined financing information has been provided. In some embodiments, the determined financing information may appear as monthly payments at a particular interest rate for each of the vehicles listed on the website associated with dealership system(s) 130. In some embodiments, providing the determined financing information in Step 730 may occur substantially at the same time for each item or class of items to be purchased. In alternative embodiments, the determined financing information for each item or class of items to be purchased may be provided to the prospective buyer at different times.

FIG. 8 illustrates an exemplary user interface that may be provided by the disclosed embodiments to provide a prospective buyer with determined financing information for an item and facilitate submission or adjustment of buyer financial information. For example, as described above in association with vehicle loan process 200 and loan information collection process 400, financial service system 110 may be configured to collect buyer financial information and, through a real-time API, receive financing information for presentation to the prospective buyer determined based at least in part on the collected buyer financial information. Aspects of the disclosed embodiments include software processes that, when executed by processors 111 and 121, generate and provide the content, questions, solicitations, etc. included in the user interface provided to buyer system 120 to receive, and process the information. Queries presented to the buyer may include, but are not limited to, questions requesting details associated with buyer loan preferences. For example, as shown in FIG. 8, a dealership website 810 associated with dealership system(s) 130 may interact with the real-time API to provide the prospective buyer with a vehicle loan notification 820. Vehicle loan notification 820 may include determined financing information, including an approval limit 822. The prospective buyer may provide buyer loan preferences through the real-time API via buyer system 120 by adjusting the adjustable down payment bar 824 and entering trade-in vehicle information 826. Aspects of the disclosed embodiments may allow buyer system 120 to select answers to the various queries presented. In some embodiments, buyer system 120 may select desired answers from drop-down menus. In other embodiments, the prospective buyer may be able to type in answers to the queries using a user input/output device (touchscreen, keyboard, voice command, or other suitable input mechanism) associated with buyer system 120. The user interface of FIG. 8 is exemplary and not limiting to the aspects of the disclosed embodiments. Other formats, types of content, queries, mechanisms for uploading, etc. can be implemented to allow financial service system 110 to receive, process, and display general desired item information from buyer system 120.

Figure 9:
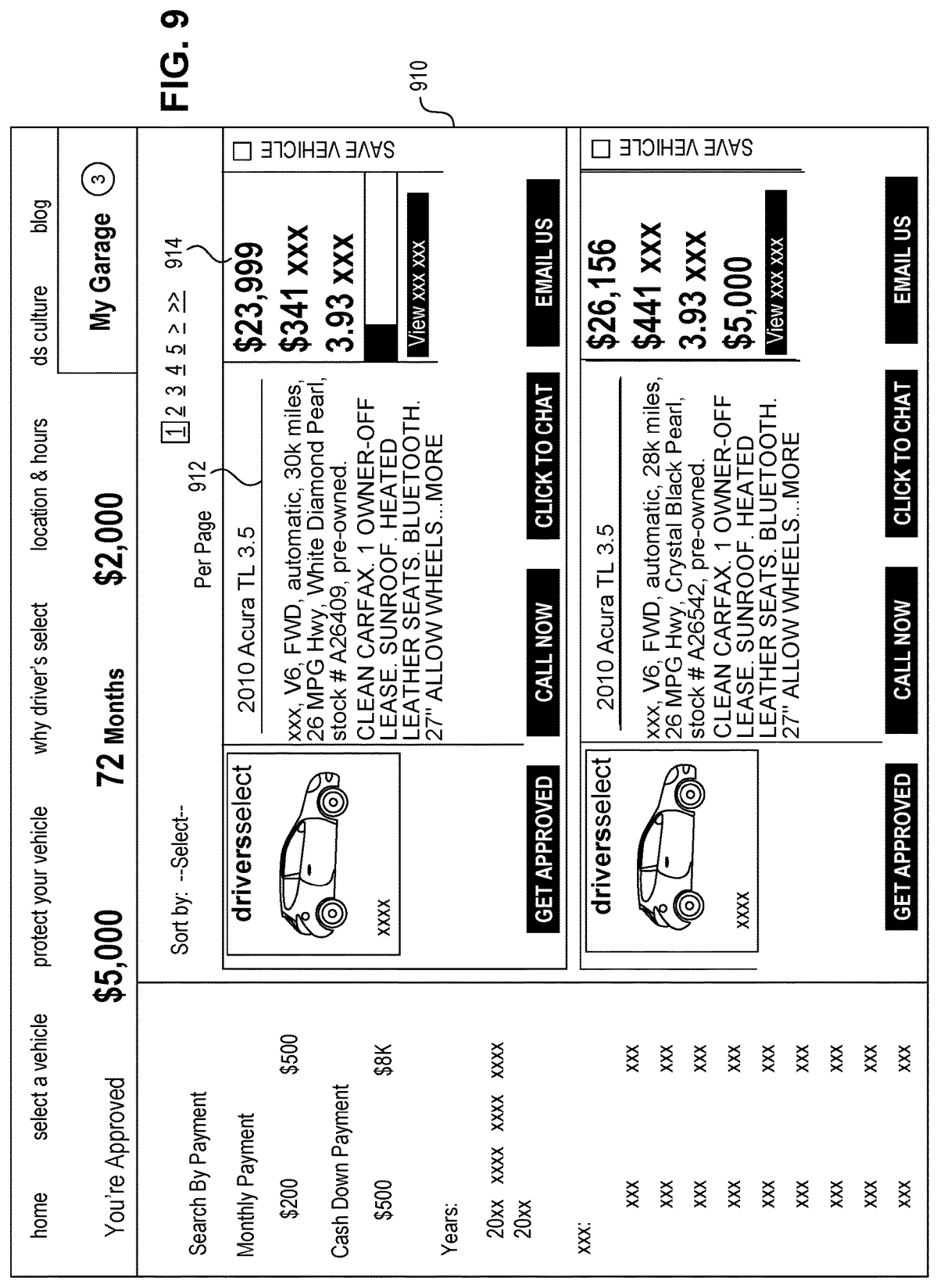

FIG. 9 illustrates an exemplary user interface that may be provided by the disclosed embodiments to provide a prospective buyer with determined financing information for multiple items in a list view. For example, as described above in association with vehicle loan process 200 and multiple vehicle loan process 700, financial service system 110 may be configured to, through a real-time API, provide determined financing information associated with each vehicle to a prospective buyer operating buyer system 120. For example, as shown in FIG. 9, a dealership multi-vehicle listing website 910 associated with dealership system(s) 130 may interact with the real-time API to provide the prospective buyer with determined financing information for each listed vehicle 912, including a vehicle loan terms 914. As shown, vehicle loan terms 914 may include the listed price of the vehicle, monthly payment, interest rate, and required down payment. From this website, the prospective buyer may identify a particular vehicle of interest amongst the listed vehicles and view corresponding financing information for each vehicle through the real-time API via buyer system 120. The user interface of FIG. 9 is exemplary and not limiting to the aspects of the disclosed embodiments. Other formats, types of content, queries, mechanisms for uploading, etc. can be implemented to allow financial service system 110 to process and display general desired item information from buyer system 120.

FIG. 10 illustrates an exemplary user interface that may be provided by the disclosed embodiments to provide a prospective buyer with determined financing information for an individual item and facilitate submission or adjustment of buyer financial information. For example, as described above in association with vehicle loan process 200 and loan information collection process 400, financial service system 110 may be configured to, through a real-time API, collect buyer financial information and provide financing information, which is determined based at least in part on the collected buyer financial information. Aspects of the disclosed embodiments include software processes that, when executed by processors 111 and 121, generate and provide the content, questions, solicitations, etc. included in the user interface provided to buyer system 120 to receive, and process the information. Queries presented to the buyer may include, but are not limited to, questions requesting details associated with buyer loan preferences. For example, as shown in FIG. 10, a dealership individual vehicle listing website 1010 associated with dealership system(s) 130 may interact with the real-time API to provide the prospective buyer with a vehicle loan term display 1012, a trade-in information link 1014, an insurance button 1016, and a reserve item button 1018. Vehicle loan term display 1012 may display the vehicle price, monthly payment, and APR interest rate associated with the listed vehicle. The prospective buyer may provide buyer loan preferences via buyer system 120 by selecting trade-in information link 1014, which allows the buyer to input or edit information relating to a trade-in vehicle. The prospective buyer may provide buyer loan preferences buyer system 120 by selecting insurance button 1016, which allows the buyer to choose an extended warranty at an additional cost of $6 per month and/or gap insurance at an additional cost of $6 per month. The prospective buyer may provide buyer loan preferences through the real-time API via buyer system 120 by selecting reserve item button 1018, which may call, e-mail, or otherwise initiate contact with the dealer associated with the listed item via buyer system 120.

In another embodiment, the prospective buyer may reserve a desired vehicle through the real-time API by selecting reserve item button 1018, which may initiate a funds transfer for a deposit from a financial account of the prospective buyer to a financial account associated with dealership system 130 to hold the vehicle for a specified length of time (e.g., days, weeks, etc.). Alternatively or additionally, the prospective buyer may purchase a desired vehicle through the real-time API by selecting a purchase item button (not shown), which may initiate the transfer of funds for a down payment from a financial account of the prospective buyer to a financial account associated with dealership system 130 and/or payment for the full/remaining balance of the vehicle from a financial account of the prospective buyer associated with financial service system 110 to the financial account associated with dealership system 130.

Aspects of the disclosed embodiments may allow buyer system 120 to select answers to the various queries presented. In some embodiments, buyer system 120 may select desired answers from drop-down menus. In other embodiments, the prospective buyer may be able to type in answers to the queries using a user input/output device (touchscreen, keyboard, voice command, or other suitable input mechanism) associated with buyer system 120. The user interface of FIG. 10 is exemplary and not limiting to the aspects of the disclosed embodiments. Other formats, types of content, queries, mechanisms for uploading, etc. can be implemented to allow financial service system 110 to receive, process, and display general desired item information from buyer system 120.

Figure 11:
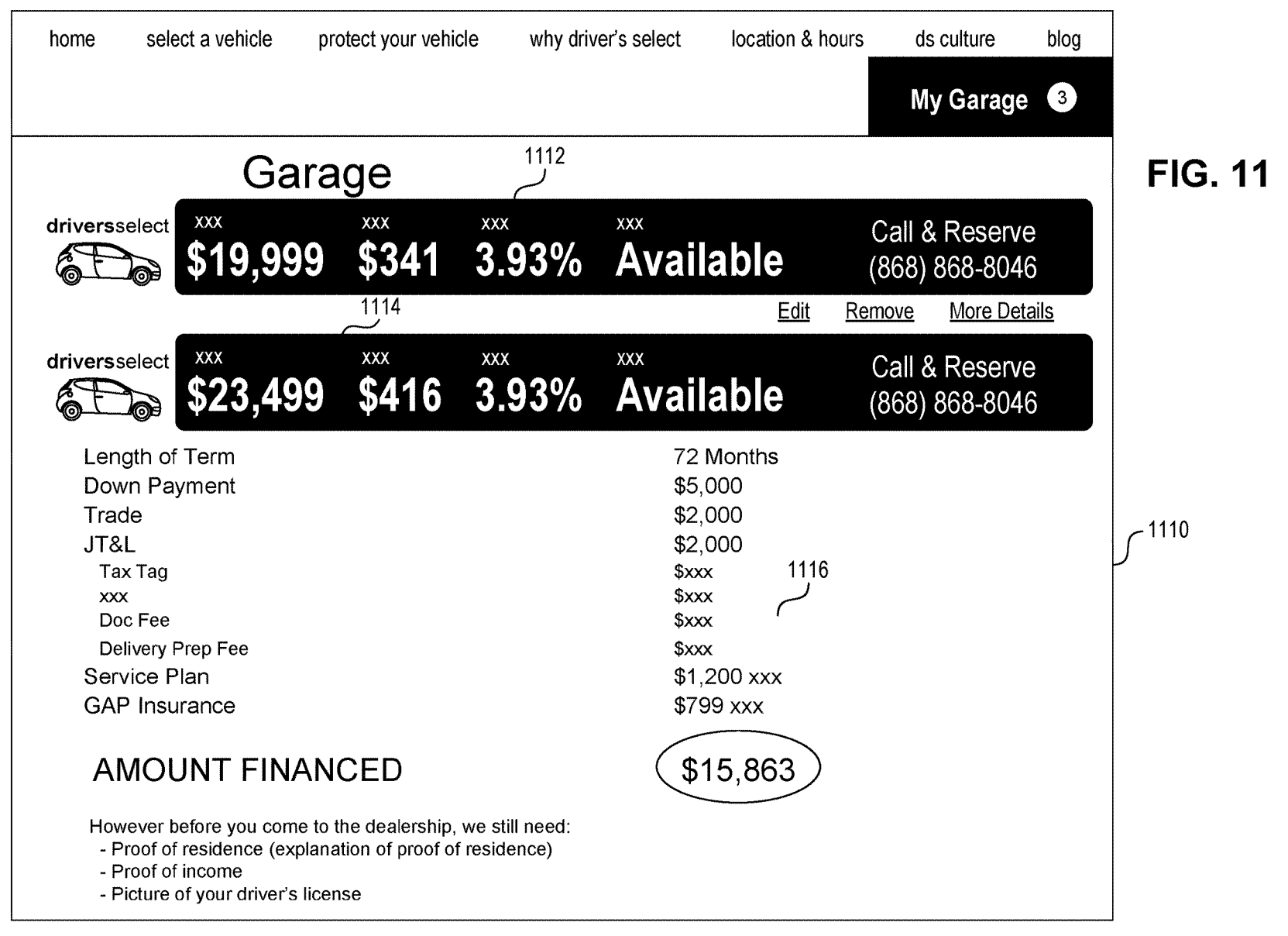

FIG. 11 illustrates an exemplary user interface that may be provided by the disclosed embodiments to provide a prospective buyer with determined financing information for multiple items selected by the prospective buyer. For example, as described above in association with vehicle loan process 200 and multiple vehicle loan process 700, financial service system 110 may be configured to, through a real-time API, provide financing information which is determined based at least in part on the collected buyer financial information. Aspects of the disclosed embodiments include software processes that, when executed by processors 111 and 121, generate and provide the content, questions, solicitations, etc. included in the user interface provided to buyer system 120 to receive, and process the information. For example, as shown in FIG. 11, a dealership "buyer's garage" portion 1110 of the website associated with dealership system(s) 130 may interact with the real-time API to provide the prospective buyer with loan term bars 1112 and 1114 and enhanced financing information 1116. In one aspect, loan term bars 1112 and 1114 may provide the vehicle price, monthly payment, APR interest rate, vehicle availability status, and dealer telephone number to reserve the listed vehicle. In one embodiment, enhanced financing information 1118 may include additional determined financing information based on buyer financing information, including a length of loan term, down payment, trade-in value, net trade-in equity, tax, tag, title costs, documentation fee, delivery preparation fee, service plan, gap insurance, and the total amount financed. The user interface of FIG. 11 is exemplary and not limiting to the aspects of the disclosed embodiments. Other formats, types of content, queries, mechanisms for uploading, etc. can be implemented to allow financial service system 110 to receive and process general desired item information from buyer system 120.

Figure 12:
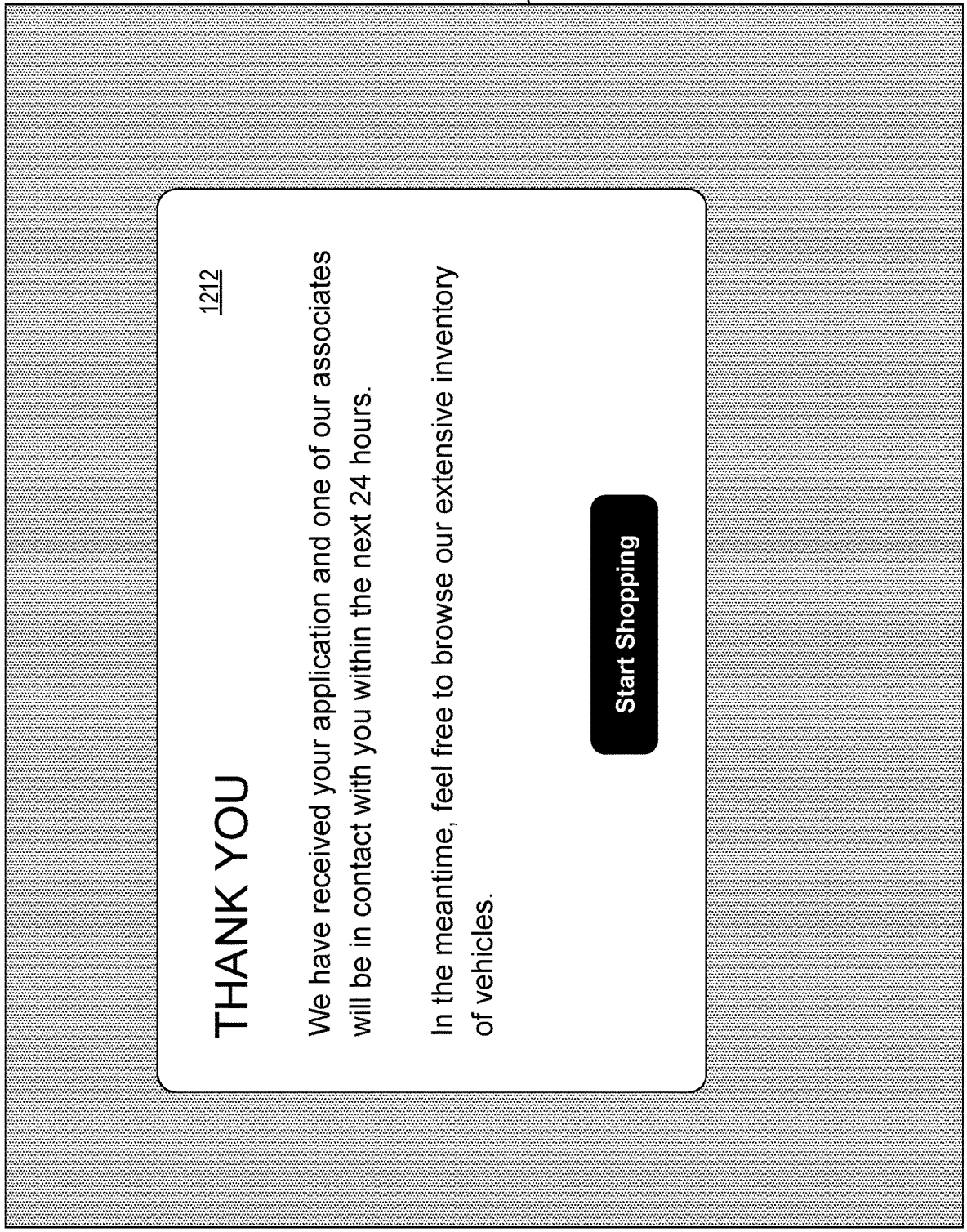
FIG. 12 is an exemplary user interface for providing notification of receipt of a loan request to the prospective buyer that may be provided, consistent with disclosed embodiments.

FIG. 12 illustrates an exemplary user interface that may be provided by the disclosed embodiments to provide a prospective buyer with a message confirming receipt of the buyer's loan request. For example, as described above in association with vehicle loan process 200 and loan approval process 500, financial service system 110 may be configured to, through a real-time API, notify the prospective buyer that the loan request has been received. Aspects of the disclosed embodiments include software processes that, when executed by processors 111 and 121, generate and provide the content, questions, solicitations, etc. included in the user interface provided to buyer system 120 to receive, and process the information. For example, dealer website 1210 associated with dealership system(s) 130 may interact with the real-time API to provide the prospective buyer with a receipt notification 1212, which informs the prospective buyer that the dealer will contact the buyer in the next 24 hours. Receipt notification 1212 provides the prospective buyer with feedback that system 100 is working, while giving financial service system 110 time to send the loan request to third party financial service providers as described in Step 540 and notify the dealer of the denied loan request as described in Step 550. The user interface of FIG. 12 is exemplary and not limiting to the aspects of the disclosed embodiments. Other formats, types of content queries, mechanisms for uploading, etc. can be implemented to allow financial service system 110 to receive and process general desired item information from buyer system 120.

The disclosed embodiments improve upon existing auto loan calculators by improving both the scope and accuracy of financial information available to a prospective buyer during the shopping process. Purchase of a large item—especially a vehicle—may invoke emotional decision-making rather than rational consideration. Mistakes made in this process are not easily undone. Accordingly, by assembling the prospective buyer's full financial profile and integrating determined financial information into the listing of items on a dealer's website, the disclosed embodiments can serve as an extra layer of protection and confidence for buyers, sellers, and associated financial institutions. The disclosed embodiments provide, among other things, enhanced information availability, convenience, and security.

Other features and functionalities of the described embodiments are possible. For example, the processes of FIGS. 2-7 are not limited to the sequences described above. Variations of these sequences, such as the removal and/or the addition of other process steps may be implemented without departing from the spirit and scope of the disclosed embodiments.

Additionally, the disclosed embodiments may be applied to different types of sales. Any financial service institution that provides loan accounts to customers may employ systems, methods, and articles of manufacture consistent with certain principles related to the disclosed embodiments. In addition, any buyer or seller of any automotive vehicle may also employ systems, methods, and articles of manufacture consistent with certain disclosed embodiments.

Furthermore, although aspects of the disclosed embodiments are described as being associated with data stored in memory and other tangible computer-readable storage mediums, one skilled in the art will appreciate that these aspects can also be stored on and executed from many types of non-transitory computer-readable media, such as secondary storage devices, like hard disks, floppy disks, or CD-ROM, or other forms of RAM or ROM. Accordingly, the disclosed embodiments are not limited to the above described examples, but are instead defined by the appended claims in light of their full scope of equivalents.

What is claimed is:

1. A networking system for providing personalized information, via user interfaces, based on remotely retrieved information from remote computer networks without requiring users to transition between websites in the user interfaces, the networking system comprising:
    memory hardware storing instructions; and
    processing hardware configured to execute the instructions to perform operations, comprising:
        providing an Application Programming Interface (API) that is accessible by a first server and configured to provide personalized information to the first server, wherein the API causes a software application installed on a client device to exchange data with the first server in a synchronous request-response pattern;
        receiving a request, for the synchronous request-response pattern, from the client device via a website associated with the first server, wherein the request comprises a specific request type for the client device to access the first server, and wherein the specific request type is designated by the API;
        generating a personalized information response, for the synchronous request-response pattern, based on the received request, the personalized information response comprising personalized information on the website;
        providing, via the API, the personalized information to the website via the first server;
        generating for display, in a user interface on the website, the personalized information;
        receiving an input modifying the personalized information;
        updating, based on the input, the personalized information;
        providing, via the API, the updated personalized information to the website via the first server; and
        generating for display, in the user interface on the website, the updated personalized information.

2. The system of claim 1, wherein the API provides the personalized information to the website in an Extensible Markup Language (XML) format or in a JavaScript Object Notation (JSON) format.

3. The system of claim 1, wherein the request comprises:
    personal identification information of a user;
    personal financial information of a user; and
    information associated with an item listed on the website.

4. The system of claim 1, wherein the personalized information comprises at least one of an automobile of a specific type, an automobile at a particular location, or an automobile within a price range set by a user.

5. The system of claim 1, wherein the personalized information comprises a vehicle and the request indicates at least one of a vehicle identification number, user proof of income, user proof of insurance, a backend product, gap insurance, a user loan optimization preference, or a third party offer.

6. The system of claim 1, wherein generating the personalized information comprises determining an interest rate, a loan duration, a number of loan payments, an amount per loan payment, or fees associated with a loan.

7. The system of claim 1, wherein the operations further comprise providing the request to a third party.

8. The system of claim 1, wherein the personalized information comprises a first vehicle of a plurality of vehicles listed on the website.

9. The system of claim 8, wherein providing the personalized information comprises providing financing terms for each vehicle of a plurality of vehicles listed on the website.

10. The system of claim 9, wherein the personalized information comprises different financing terms for each of vehicle of a plurality of vehicles listed on the website.

11. A method for providing personalized information for potential users via user interfaces on websites without the potential users leaving the websites, comprising:
    providing an Application Programming Interface (API) that is accessible by a first server and configured to provide personalized information to the first server, wherein the API causes a software application installed on a client device to exchange data with the first server in a synchronous request-response pattern;
    receiving a request, for the synchronous request-response pattern, from the client device via a website associated with the first server, wherein the request comprises a specific request type for the client device to access the first server, and wherein the specific request type is designated by the API;
    generating a personalized information response, for the synchronous request-response pattern, based on the received request, the personalized information response comprising personalized information on the website;
    providing, via the API, the personalized information to the website via the first server;
    generating for display, in a user interface on the website, the personalized information;
    receiving an input modifying the personalized information;
    updating, based on the input, the personalized information;
    providing, via the API, the updated personalized information to the website via the first server to display the updated personalized information; and
    generating for display, in the user interface on the website, the personalized information.

12. The method of claim 11, wherein the API provides the personalized information to the website via the first server in an Extensible Markup Language (XML) format or in a JavaScript Object Notation (JSON) format.

13. The method of claim 11, wherein the request comprises:
    personal identification information of a user;
    personal financial information of a user; and
    information associated with an item listed on the website.

14. The method of claim 11, wherein the personalized information comprises at least one of an automobile of a specific type, an automobile at a particular location, or an automobile within a price range set by a user.

15. The method of claim 11, wherein the personalized information comprises a vehicle and the request indicates at least one of a vehicle identification number, user proof of income, user proof of insurance, a backend product, gap insurance, a user loan optimization preference, or a third party offer.

16. The method of claim 11, wherein generating the personalized information response comprised determining an interest rate, a loan duration, a number of loan payments, an amount per loan payment, or fees associated with a loan.

17. The method of claim 11, further comprising providing the request to a third party.

18. The method of claim 11, wherein the personalized information comprises a first vehicle of a plurality of vehicles listed on the website.

19. The method of claim 18, wherein providing the personalized information comprises providing financing terms for each vehicle of a plurality of vehicles listed on the website.

20. The method of claim 11, wherein the personalized information comprises different financing terms for each vehicle of a plurality of vehicles listed on the website.

* * * * *